United States Patent [19]

Harada et al.

[11] Patent Number: 4,784,052

[45] Date of Patent: Nov. 15, 1988

[54] COOKING APPLIANCE

[75] Inventors: Mitsuo Harada, Tokyo; Takuji Harada, Hiratsuka, both of Japan

[73] Assignee: Harada Kogyo Kabushiki Kaisha, Tokyo, Japan

[21] Appl. No.: 90,747

[22] Filed: Aug. 28, 1987

[30] Foreign Application Priority Data

Dec. 16, 1986 [JP] Japan ................................. 142,088

[51] Int. Cl.⁴ .............................................. A47J 27/00
[52] U.S. Cl. ................................................... 99/331
[58] Field of Search .......................... 99/331; 177/245

[56] References Cited

U.S. PATENT DOCUMENTS 3,182,166  5/1965  Bohm et al. ................. 99/331 X
4,476,946 10/1984  Smith ......................... 177/245 X

FOREIGN PATENT DOCUMENTS 1367218 12/1964 Italy ................................ 99/331

Primary Examiner—Mark J. Thronson
Attorney, Agent, or Firm—Koda and Androlia

[57] ABSTRACT

A cooking appliance having a weight measuring device for measuring the weight of a container and the contents thereof, a storing device for memorizing the weight of the container and the content data, a weight variation detector for detecting the weight lost from the container and contents thereof at a specified ratio or by a specified weight from the weight of the container and contents thereof at the start of cooking, and a heating operation stopping device for stopping the heating of the container and contents thereof when the weight thereof is reduced to a specified ratio or by a specified weight from the weight of container and contents thereof at the start of cooking.

1 Claim, 2 Drawing Sheets

COOKING APPLIANCE

BACKGROUND OF THE INVENTION

1. Field of the Invention

The present invention relates to a cooking appliance.

2. Prior Art

Conventional cooking appliances, for example electromagnetic cookers, are provided with temperature sensors. In order to prevent utensils heated thereon (such as pots, pans, kettles, etc.) from being overheated, when the temperature sensor senses a temperature exceeding a preset temperature (e.g. 120° to 130° C. or higher) heating is automatically stopped.

In the above described conventional appliances, when water is contained in the object to be heated, the temperature is maintained at around 100° C. When the temperature increases above a set temperature of about 130° C., heating is stopped. However, at that point, the contents of the utensil being heated would have already been burnt up and stuck to the utensil. Thus, conventional appliances are not quite as desirable as they could be in view of the cooking purposes.

On the other hand, electromagnetic cookers having timers instead of temperature sensors, as described above, work as expected if an appropriate time is set. However, when such a cooker is used by an elderly person or a person who is not accustomed to handling this type of appliance, it may happen that the timer is set for the maximum time. In such a situation, a timer cannot be used effectively and as in the above described case, burning will result.

SUMMARY OF THE INVENTION

The present invention intends to solve the foregoing problems of conventional cooking appliances.

The primary object of the present invention is to provide a cooking appliance which does not cause burning even when it is used by a person who is not familiar with the handling of such an appliance.

In keeping with the principles of the present invention, the objects are accomplished by a unique structure for a cooking appliance including a weight measuring means which measures the weight of the object to be heated at the start of cooking; a storing means which memorizes the weight of the object to be heated; a weight detecting means which detects the weight of the object being heated as it decreases to a specified ratio of the weight at the start of cooking or detects the weight of the object as it is reduced by a specified amount from the weight at the start of cooking; and a heating operation stopping means which stops heating the object when the weight of the object decreases to a specified weight ratio or when the weight of the object is reduced by a specified weight. With the above described cooking appliance burning can be avoided even when the appliance is used by person who is not accustomed to handling this type of appliance.

DETAILED DESCRIPTION OF THE INVENTION

Figure 1:
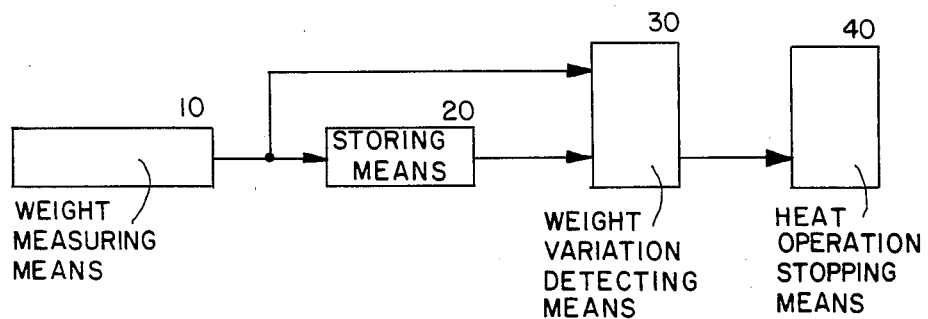
FIG. 1 is a block diagram showing the present invention.

FIG. 1 is a block diagram illustrating the present invention.

The present invention includes a weight measuring means 10, a storing means 20, a weight variation detecting means 30 and a heating operation stopping means 40.

The weight measuring means 10 measures the total weight of a container (such as pot, etc.) and the contents thereof which are heated together. The storing means 20 stores the thus measured weight data. The weight variation detecting means 30 detects the weight of the container and contents thereof as it decreases to a specified ratio of its weight at the start of the cooking process, or the weight of the container and contents thereof as it is reduced by a specified weight from the weight at the start of the cooking. The heating operation stopping means 40 stops the container from being heated when the weight of the container and contents thereof decreases to a specified ratio in comparison to the weight at the start of the cooking process or when the weight thereof is reduced by a specified amount from the weight at the start of cooking.

Figure 2:
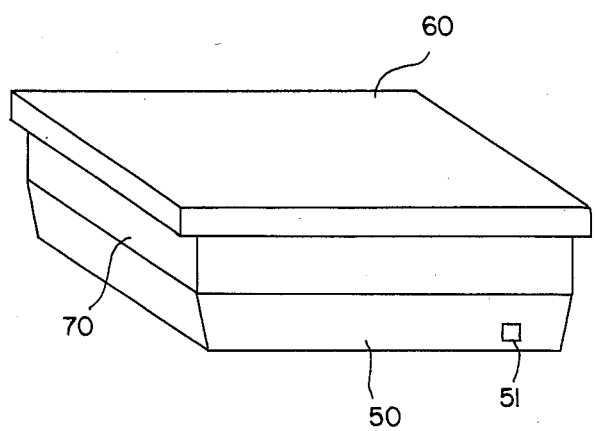
FIG. 2 is a perspective view showing an embodiment of the present invention.

FIG. 2 is a perspective view showing an embodiment of the present invention.

In this embodiment, for the purposes of giving a description thereof, an electromagnetic cooker using an electromagnetic system as the heating power source is employed.

A weight measuring support base 70 is provided between a controlling-power source section 50 and a heating plate 60. A heating button 51 for starting the heating process is disposed at a part of the controlling-power source section 50.

Figure 3:
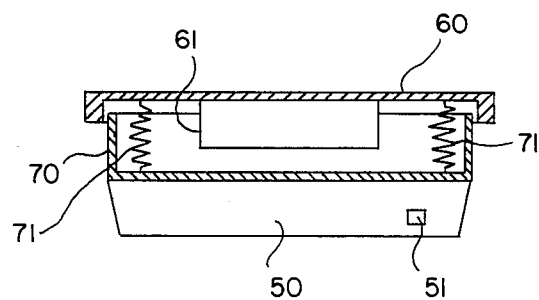
FIG. 3 is a sectional view of the essential portion of FIG. 2.

FIG. 3 is a longitudinal sectional view of the embodiment shown in FIG. 2.

In FIG. 3 a heating section 61 is provided beneath the plate 60 and a spring balance 71 is installed between the plate 60 and the controlling-power source section 50.

The weight measuring means 10, the storing means 20, the weight variation detecting means 30 and the heating operation stopping means 40 shown in FIG. 1 are provided in the controlling-power source section 50.

In practical use, the weight variation detecting means 30 and the heating operation stopping means 40 are constructed of a microcomputer which is built in the controlling-power source section 50.

Hereunder, a description of the operation of the embodiment will be provided.

Figure 4:
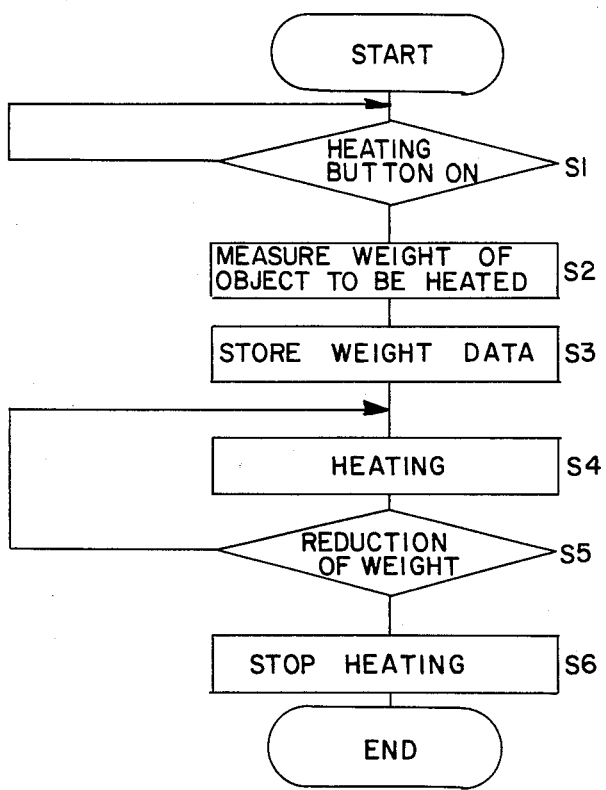
FIG. 4 is a flow chart showing the operation of the embodiment.

FIG. 4 is a flow chart showing the operation of the above described embodiment.

When the heating button 51 is turned ON (S1), the weight measuring means 10 measures the weight of the object to be heated (food, water, condiments, etc.) and the container that it is to be heated in (such as pot, etc.). In other words, the weight of the container and the contents thereof are measured at the start of the cooking process (S2). The measurement data thus obtained is stored in the storing means (S3).

Thereafter, heating is carried out (S4) and at specified times the weight of the container and the contents thereof are measured so as to check whether or not the weight thereof is reduced by a specified weight (S5).

When the appliance detects that the weight of the object is reduced by the specified weight, heating is stopped (S6).

Usually, the object being heated has a specific water content and as the heating time increases, the amount of water contained in the object evaporates. As a result, the weight of the object is gradually reduced. Thus, the amount that the weight will be reduced can be set in advance so that heating can be stopped when the weight is decreased to a preset weight. In this way burning, which can be caused by the evaporation of all of the water content of the object being heated, can be prevented.

In step S5, a specified ratio, for example 10%, 20%, etc., of the weight of the object to be heated at the start of the cooking process may be set or a fixed reduction amount, such as 50 g, 100 g, etc., may be set.

Furthermore, it is also possible to set a plurality of specified ratios or fixed weights in step S5 so that a preferred value can be selected from the set ratios or weights.

The foregoing invention meets the needs of a society which has an increasing percentage of older people and must deal with many aspects of deterioration in the thinking faculties of the elderly.

In the above described embodiment, the weight variation detecting means 30 and the heating operation stopping means 40 are constructed of microcomputers, but they could also be constructed from parts other than microcomputers.

Furthermore, in the above embodiment, an electromagnetic system is used as the power source for the heating means (electromagnetic cooker). This invention can also be applied to heating apparatuses which utilize other heating means such as electricity, gas, petroleum, etc. in addition to that mentioned above.

In addition, the present invention can be used effectively even by a person who is not experienced in handling such a cooking appliance, and thus the burning of food, damage to cookware, etc. can be easily prevented.

We claim:

1. A method of operating a cooking appliance, said method comprising:
   a step of operating a weight measuring means, said step of operating a weight measuring means including a step of measuring the weight of an object to be heated at the start of cooking and successively at specified times;
   a step of operating a storing means, said step of operating a storing means including a step of memorizing the measured weight of the object to be heated at the start of cooking;
   a step of operating a weight variation detecting means, said step of operating a weight variation detecting means including a step of detecting that the weight of said object has decreased to a specified ratio of the weight of the object at the start of cooking, or that the weight of said object is reduced by a specified weight from the weight of the object at the start of cooking, said step of operating a weight variation detecting means further including a step of responding to said weight measuring means and said storing means; and
   a step of operating a heating operation stopping means, said step of operating a heating operation stopping means including a step of stopping heating of said object when the weight of said object has decreased to the specified weight ratio of the weight of said object at the start of cooking or when the weight of said object is reduced by the specified weight from the weight of the object at the start of cooking, said step of operating a heating operation stopping means including a step of responding to said weight variation detecting means.

* * * * *

UNITED STATES PATENT AND TRADEMARK OFFICE
CERTIFICATE OF CORRECTION

PATENT NO. : 4,784,052
DATED : November 15, 1988
INVENTOR(S) : Mitsuo Harada and Takuji Harada It is certified that error appears in the above-identified patent and that said Letters Patent is hereby corrected as shown below: Title page:

Item [30] Foreign Application Priority Data

Change "Dec. 16, 1986 [JP]" to "Sept 16, 1986 [JP]" and change "142,088" to "142,088/86"

Signed and Sealed this

Eighteenth Day of April, 1989

Attest:

DONALD J. QUIGG

*Attesting Officer*  *Commissioner of Patents and Trademarks*